United States Patent
Wong (10) Patent No.: US 11,910,401 B2
(45) Date of Patent: **\*Feb. 20, 2024**

(54) BASE STATION AND USER EQUIPMENT

(71) Applicant: Sony Group Corporation, Tokyo (JP)

(72) Inventor: Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,937

(22) Filed: Nov. 21, 2022

(65) Prior Publication Data

US 2023/0124812 A1 Apr. 20, 2023

Related U.S. Application Data (63) Continuation of application No. 17/256,004, filed as application No. PCT/EP2019/067395 on Jun. 28, 2019, now Pat. No. 11,510,235.

(30) Foreign Application Priority Data

Jun. 28, 2018 (EP) ..................................... 18180486

(51) Int. Cl.
*H04W 72/0446* (2023.01)
*H04W 72/23* (2023.01)
(Continued)

(52) U.S. Cl.
CPC ........... *H04W 72/23* (2023.01); *H04L 1/1614* (2013.01); *H04W 72/0446* (2013.01);
(Continued)

(58) Field of Classification Search
CPC ......... H04W 72/1289; H04W 72/0446; H04W 72/0453; H04W 72/1247; H04W 72/1257; H04L 1/1614
See application file for complete search history.

(56) References Cited

U.S. PATENT DOCUMENTS 11,510,235 B2 * 11/2022 Wong ................ H04W 72/0446
2008/0009305 A1 * 1/2008 Li .......................... H04W 72/30
455/517

(Continued)

FOREIGN PATENT DOCUMENTS

| WO | 2017/193330 A1 | 11/2017 |
| WO | 2018/050431 A1 | 3/2018 |
| WO | 2018/228865 A1 | 12/2018 |

OTHER PUBLICATIONS

International Search Report and Written Opinion dated Aug. 7, 2019, received for PCT Application No. PCT/EP2019/067395, Filed on Jun. 28, 2019, 12 pages.

(Continued)

*Primary Examiner* — Christine Ng
(74) *Attorney, Agent, or Firm* — XSENSUS LLP (57) ABSTRACT

A base station for a mobile telecommunications system has circuitry configured to communicate with at least one user equipment, wherein the circuitry is further configured to: transmit, to the at least one user equipment, a multi-level pre-emption indicator for indicating, as first level information, first information about resources used for at least one short-data transmission within a transmission region which may contain at least one long-data transmission of the at least one user equipment, and, as second level information, second information about the resources used for the short-data transmission, wherein the second information more accurately indicates the resources used than the first information.

20 Claims, 7 Drawing Sheets

(51) Int. Cl.
*H04L 1/1607* (2023.01)
*H04W 72/0453* (2023.01)
*H04W 72/50* (2023.01)
*H04W 72/566* (2023.01)

(52) U.S. Cl.
CPC ..... *H04W 72/0453* (2013.01); *H04W 72/535* (2023.01); *H04W 72/566* (2023.01)

(56) References Cited

U.S. PATENT DOCUMENTS

| | | | |
|---|---|---|---|
| 2011/0149898 A1* | 6/2011 | Kim | H04L 5/001 370/329 |
| 2016/0080043 A1* | 3/2016 | Tian | H04L 5/0007 375/267 |
| 2018/0035332 A1* | 2/2018 | Agiwal | H04W 28/16 |
| 2018/0063865 A1* | 3/2018 | Islam | H04L 5/0064 |
| 2018/0070341 A1 | 3/2018 | Islam et al. | |
| 2019/0254029 A1* | 8/2019 | Li | H04L 5/0092 |
| 2019/0254081 A1 | 8/2019 | Li et al. | |
| 2020/0008179 A1* | 1/2020 | Lee | H04L 1/1664 |
| 2020/0022112 A1* | 1/2020 | Yasukawa | H04L 5/0053 |
| 2020/0120662 A1* | 4/2020 | Gao | H04W 72/51 |
| 2020/0120680 A1* | 4/2020 | Hwang | H04W 72/53 |
| 2020/0178240 A1* | 6/2020 | Zhang | H04L 5/0055 |
| 2020/0280980 A1* | 9/2020 | Myung | H04L 1/1812 |
| 2021/0160030 A1* | 5/2021 | Myung | H04L 5/0053 |

OTHER PUBLICATIONS

Huawei et al., "On Pre-Emption Indication for DL Multiplexing of URLLC and eMBB", 3GPP TSG RAN WG1 Ad Hoc Meeting, R1-1715409, Nagoya, Japan, Sep. 18-21, 2017, 15 pages.

Huawei et al., "Remaining Aspects on Pre-Emption Indication for DL Multiplexing of URLLC and eMBB", 3GPP TSG RAN WG1 Meeting No. 91, R1-1721452, Reno, USA, Nov. 27-Dec. 1, 2017, 11 pages.

LG Electronics, "Remaining Issues on Pre-Emption Indication for Downlink", 3GPP TSG RAN WG1 Meeting 90bis, R1-1717970, Prague, CZ, Oct. 9-13, 2017, 15 pages.

Intel Corporation, "Remaining Details of Multiplexing of Different Data Channel Durations", 3GPP TSG RAN WG1 Meeting 91, R1-1720099, Reno, USA, Nov. 27-Dec. 1, 2017, pp. 1-8.

NTT DOCOMO, Inc., "Revised WID on New Radio Access Technology", 3GPP TSG RAN Meeting No. 78, RP-172834, Dec. 18-21, 2017, 11 pages.

3GPP, "Multiplexing and Channel Coding", 3GPP TS 38.212 version 15.6.0 Release 15, ETSI TS 138 212 V15.6.0, Jul. 2019, pp. 1-105.

* cited by examiner

BASE STATION AND USER EQUIPMENT

CROSS-REFERENCE TO RELATED APPLICATIONS

The present application is a continuation of U.S. application Ser. No. 17/256,004, filed Dec. 24, 2020, which is based on PCT filing PCT/EP2019/067395, filed Jun. 28, 2019, which claims priority to EP 18180486.5, filed Jun. 28, 2018, the entire contents of each are incorporated herein by reference.

TECHNICAL FIELD

The present disclosure generally pertains to base stations and user equipment for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications Advanced Standard (IMT Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as some aspect of LTE was based on previous generations of mobile communications technology.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

The 3GPP Rel-15 New Radio (NR) Access Technology Work Item RP-172834, "Work Item on New Radio (NR) Access Technology," NFI DOCOMO, RAN #78, Lisbon, Portugal, Dec. 18-21, 2017, which specifies the 5$^{th}$ generation or 5G radio access network, mentions and specifies, i.e., two NR functionalities, namely:
  Enhanced Mobile Broadband (eMBB), and
  Ultra Reliable & Low Latency Communications (URLLC),
wherein eMBB services are characterized by high capacity with a requirement to support up to 20 Gb/s. For efficient transmission of large amounts of data at high throughput, eMBB requires long scheduling time so as to minimize the overhead used (where the "scheduling time" we refer to is the time to allocate and transmit a data packet). A known important requirement for URLLC is low latency measured from the ingress of a layer 2 packet to its egress from the network, with a proposed target of 1 ms. The URLLC data is expected to be short and hence a short scheduling time where the control and data have short duration are required within a frame duration that is significantly less than that of the eMBB frame.

Generally, it is known to pre-empt resources of an ongoing transmission, such as eMBB, such that pre-empted resources can be used for low latency transmission such as URLL Although there exist techniques for transmission of data in pre-empted resources, it is generally desirable to improve the existing techniques.

SUMMARY

According to a first aspect, the disclosure provides a base station for a mobile telecommunications system comprising circuitry configured to communicate with at least one user equipment, wherein the circuitry is further configured to transmit, to the at least one user equipment, a multi-level pre-emption indicator for indicating, as first level information, first information about resources used for at least one short-data transmission within a transmission region which may contain at least one long-data transmission of the at least one user equipment, and, as second level information, second information about the resources used for the short-data transmission, wherein the second information more accurately indicates the resources used than the first information.

According to a second aspect, the disclosure provides a user equipment for a mobile telecommunications system comprising circuitry configured to communicate with at least one base station, wherein the circuitry is further configured to receive, from the at least one base station, a multi-level pre-emption indicator indicating, as first level information, first information about resources used for at least one short data transmission within a transmission region which may contain at least one long data transmission of the at least one user equipment, and, as second level information, second information about the resources used for the short-data transmission, wherein the second information more accurately indicates the resources used than the first information Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
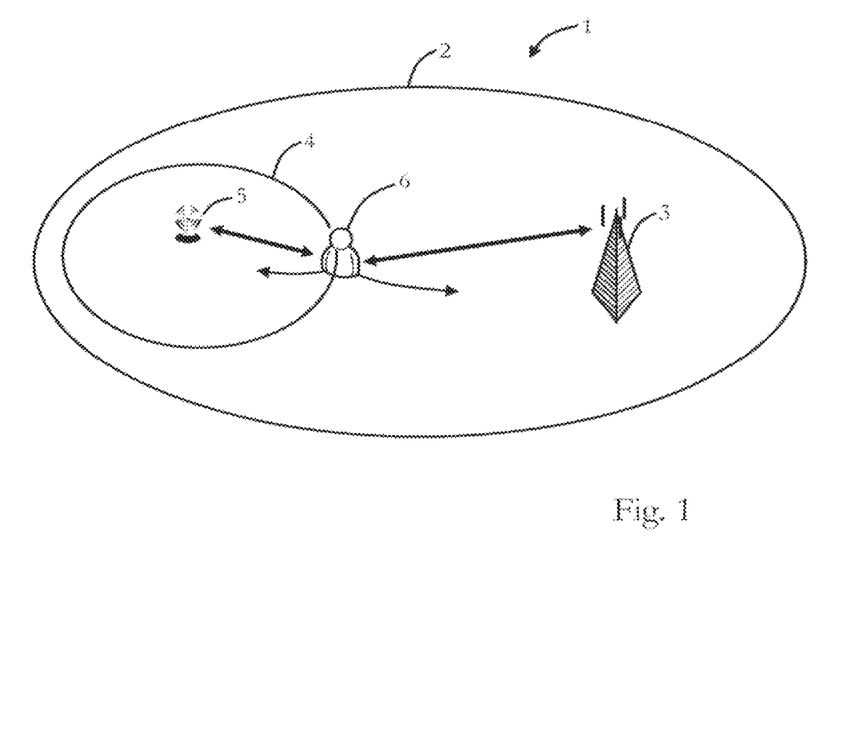
FIG. 1 illustrates an embodiment of a radio access network.

Before a detailed description of the embodiments under reference of FIG. 1 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

One of the candidates for meeting the 5G requirements are termed New Radio (NR) Access Technology Systems (NR). Some aspects of NR can be based on LTE technology, in some embodiments, just as some aspects of LTE were based on previous generations of mobile communications technology.

As mentioned in the outset, two new functionalities for the New Radio (NR) Access Technology, which are discussed, are Enhanced Mobile Broadband (eMBB) and Ultra Reliable & Low Latency Communications (URLLC) services.

A typical embodiment of an NR radio network RAN 1 is illustrated in FIG. 1. The RAN 1 has a macro cell 2, which is established by an LTE eNodeB 3, and an NR cell 4, which is established by an NR eNodeB 5 (also referred to as gNB (next generation eNodeB).

A UE 6 can communicate with the LTE eNodeB 3 and, as long as it is within the NR cell 4, it can also communicate with the NR eNodeB 5.

Figure 2A:
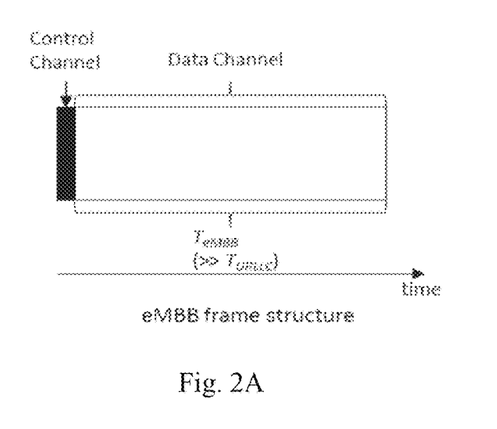
FIG. 2A illustrates an example of an eMBB frame structure.

As mentioned, eMBB services are characterized in some embodiments by high capacity with a requirement to support up to 20 Gb/s. For efficient transmission of large amounts of data at high throughput, eMBB requires a long scheduling time so as to minimize the overhead used (wherein, in some embodiments, the "scheduling time" is the time to allocate and transmit a data packet). An example of an eMBB frame structure, which is used in some embodiments, is shown in FIG. 2A with a transmission period $T_{eMBB}$. In this example, the control channel uses significantly smaller transmission resources than that of the data channel.

Figure 2B:
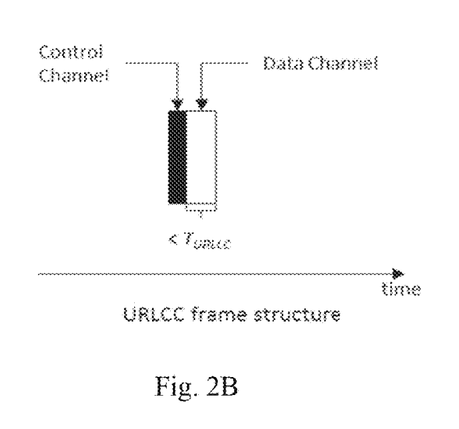
FIG. 2B illustrates an example of a URLCC frame structure.

In some embodiments, as mentioned, a requirement for URLLC is low latency measured from the ingress of a layer 2 packet to its egress from the network, with a proposed target of 1 ms, without limiting the present disclosure in that regard. The URLLC data may be expected to be short and hence a short scheduling time where the control and data have short duration are required in some embodiments within a frame duration that is significantly less than that of the eMBB frame. An example of URLLC frame structure, which is used in some embodiments, is shown in 2B with a transmission period of $T_{URLLC}$ (e.g. 0.25 ms), where the control and data channels occupy a short duration of time. In this example, the transmission period of URLLC $T_{URLLC}$ is much smaller than that of eMBB $T_{eMBB}$, i.e. $T_{eMBB} \gg T_{URLLC}$.

One aspect in the operation of eMBB and URLLC in a cell or gNB is in some embodiments that the gNB is able to pre-empt the resources of an ongoing transmission e.g. eMBB, so that it can use these pre-empted resources to transmit the low latency transmission such as URLLC.

Figure 3:
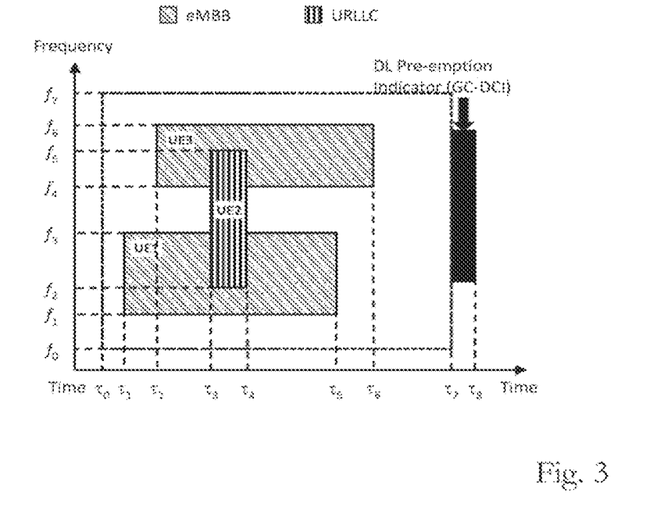
FIG. 3 illustrates transmission of a pre-emption indicator in a control channel.

In some embodiments, a Pre-emption Indicator for downlink eMBB and URLLC multiplexing may be provided, wherein the Pre-emption Indicator is signalled in a control channel, i.e. DCI (downlink control information), after the eMBB transmission, as is illustrated in FIG. 3.

Here, an eMBB transmission is transmitted to a UE, e.g. UE1 between time $\tau_1$ and $\tau_5$ in the frequency range between $f_1$ to $f_3$. At a point of time $\tau_3$, the gNB (e.g. gNB 5 of FIG. 1) transmits a URLLC in the frequency range of $f_2$ to $f_5$ to another UE, e.g. UE2 where this URLLC transmission ends at time $\tau_4$. In other words, the URLLC transmission for UE2 pre-empts part of the resources that are originally scheduled for UE 1's eMBB transmission. A downlink Pre-emption Indicator is transmitted by the gNB at time $\tau_7$ to indicate to UE1 that part of its resources have been pre-empted so that UE1 can take ameliorative steps in decoding the eMBB message, e.g. UE1 can zero out the soft bits corresponding to the pre-empted parts.

In Rel-15 NR, the downlink (DL) Pre-emption Indicator is transmitted using a Group Common DCI (GC-DCI or known as DCI Format 2_1 in 3GPP, see, for example, 3GPP TS 38.212, "Multiplexing and channel coding (Release 15)", V1.1.0, 2017-10), where a GC-DCI contains control information for a group of UEs.

The rationale behind using GC-DCI in some embodiments is that the URLLC in the downlink is expected to occupy a wide frequency bandwidth (but a narrow period of time) and so it is likely that the URLLC will pre-empt more than one eMBB UE.

For example in FIG. 3, the URLLC transmitted to UE2 occupies frequency resources from $f_2$ to $f_5$, which would pre-empt resources originally scheduled for UE1 and UE3. Instead of transmitting multiple Pre-emption Indicators, it is deemed more efficient to transmit a single Pre-emption Indicator to a group of UEs. This Pre-emption Indicator just needs to indicate the resources occupied by the URLLC, e.g. occupying time $\tau_3$ to $\tau_4$ and frequency $f_2$ to $f_5$. The UEs receiving this Pre-emption Indicator will determine which resources indicated by the Pre-emption Indicator overlap with its most recent eMBB transmission. For instance, in FIG. 3 UE1 will determine that the resources between time $\tau_3$ and $\tau_4$ and frequency $f_2$ and $f_3$ are pre-empted, whilst UE3 will determine that the resources between time $\tau_3$ and $\tau_4$ and frequency $f_4$ and $f_5$ are pre-empted.

The GC-DCI carrying the Downlink Pre-emption Indicator addresses a Reference Downlink Region (RDR) in some embodiments. For example, in FIG. 3 an RDR is defined between time $\tau_0$ and $\tau_7$ and between frequency $f_0$ to $f_7$. The Pre-emption Indicator carried by the GC-DCI may only indicate pre-empted resources if it falls within this RDR. An eMBB UE with transmission that falls within the RDR will read in some embodiments the Pre-emption Indicator in the corresponding GC-DCI to determine where (if any), the pre-empted resources are. The RDR may occur periodically in time, i.e. a GC-DCI is transmitted periodically, and occupies a fixed frequency region. In the above-mentioned Rel-15 NR, the frequency region occupied by the RDR is equivalent to the Bandwidth Part (BWP) of the UEs configured to monitor the GC-DCI corresponding to that RDR. In some embodiments, the BWP is a fraction of the system bandwidth configured by the network for a UE to operate in and the rationale is that a UE operating in a narrow bandwidth would consume less power than one operating over the whole (and much wider) system bandwidth.

Figure 4A:
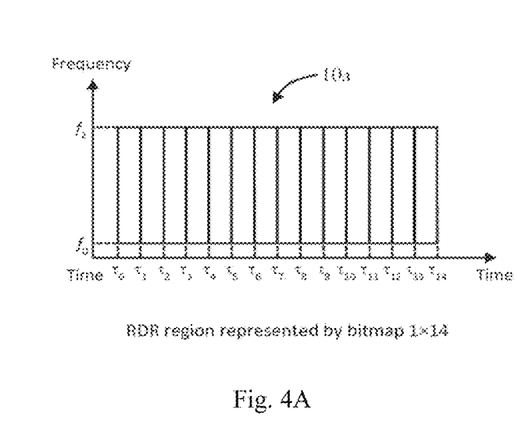
FIG. 4A illustrates a division of an RDR.
Figure 4B:
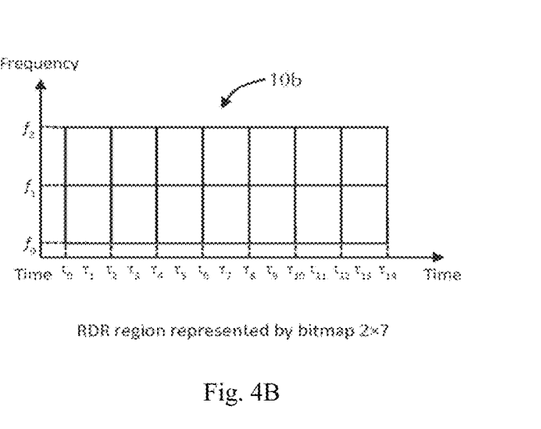
FIG. 4B illustrates another division of an RDR.

In Rel-15 NR mentioned above, the information bits for the Downlink Pre-emption Indicator are fixed at 14 bits, wherein it can be RRC configured to indicate either a bitmap of 1×14 or a bitmap of 2×7, which determines how the RDR is divided into resource regions, such that in some embodiments, generally, also the information bits for the Downlink Pre-emption Indicator are fixed at 14 bits. That is the RDR can be divided into 1 frequency region by 14 time regions or two frequency regions by seven time regions as also illustrated in FIGS. 4A and 4B, where a RDR is shown to occupy time $\tau_0$ to $\tau_{14}$ and frequency $f_0$ to $f_2$. The RDR resource regions grid 10a in 4A (left hand side) is represented by the bitmap 1×14 and the RDR resource regions grid 10b in 4B (right hand side) is represented by the configured bitmap 2×7. The bitmap indicates which resource region is pre-empted.

Since the bitmap grid of 1×14 or 2×7 is projected onto the RDR in some embodiments, the granularity of each region may be dependent upon the size of the RDR. That is if the RDR is large then the granularity is coarse and vice-versa when the RDR is small.

Figure 5:
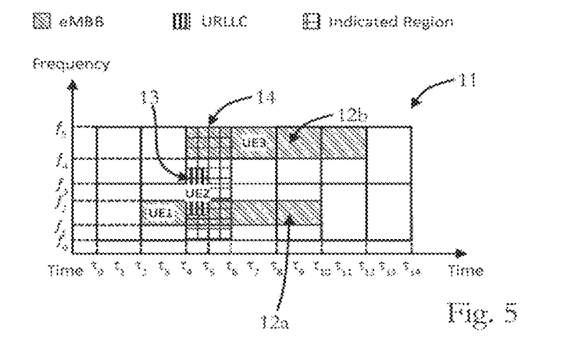
FIG. 5 illustrates two eMBB transmissions in an RDR.

For instance, as illustrated in FIG. 5, consider an RDR 11 which occupies the time $\tau_0$ to $\tau_{14}$ and frequency $f_0$ to $f_5$. Two eMBB UEs, UE1 and UE3 are scheduled at time $\tau_2$ and $\tau_4$, respectively, for a first eMBB transmission 12a and a second eMBB transmission 12b, respectively. During the transmissions of these two eMBBs 12a and 12b, the gNB transmitted a URLLC transmission 13 to UE2 during time $\tau_4$ to $\tau_5$, which pre-empted some of the resources for UE1.

If the resource grid using bitmap 2×7 is configured, the gNB would indicate 2 resource regions, i.e. the entire RDR between time $\tau_4$ to $\tau_6$ is pre-empted as shown as small grid region 14 (indicated region) in FIG. 5. In this scenario, the UE1 would then assume a much larger pre-empted region than necessary and UE3 which is not even pre-empted would assume that a quarter of its resources are pre-empted. Hence, the coarse granularity of the Pre-emption Indicator may cause a ghost pre-emption, i.e. resources that are not pre-empted by wrongly indicated to be pre-empted. This may have a significant impact to the UE decoding performance in some instances.

In addition to coarse granularity of the Pre-emption Indicator, ghost pre-emption may also occur when UEs with different Bandwidth Parts (BWP) share the same Pre-emption Indicator. It should be noted that BWP is UE specific in some embodiments, whereas Pre-emption Indicator may be group common.

Figure 6:
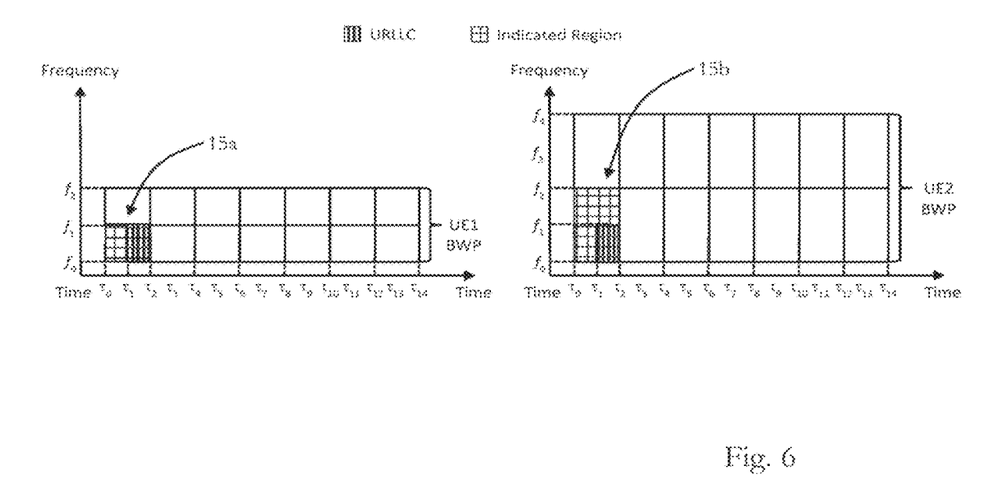
FIG. 6 illustrates ghost pre-emptions due to different BWPs.

For example, as illustrated in FIG. 6, UE1 (left hand side) and UE2 (right hand side) have different BWPs where BWP (left side of FIG. 6) for UE1 occupies frequency $f_0$ to $f_2$ whilst BWP (right side of FIG. 6) for UE2 occupies $f_0$ to $f_4$. Both UE1 and UE2 share the same Pre-emption Indicator using a 2×7 resource grid. Since the RDR is equal to the BWP size, UE1 and UE2 have a different understanding of the size of the pre-empted region in this example. Assume that URLLC occurs at time $\tau_1$ to $\tau_2$ and frequency $f_0$ to $f_1$. The Pre-emption indicator would then indicate the lower left hand resource region 15a, 15b as pre-empted. UE1 would interpret the pre-empted region 15a to occupy time $\tau_0$ to $\tau_2$ and frequency $f_0$ to $f_1$ whilst UE2 would interpret the pre-empted region 15b to occupy time $\tau_0$ to $\tau_2$ and frequency $f_0$ to $f_2$. It is observed that UE2 suffers from larger ghost pre-emption compared to UE1 in such instances.

Hence, in some embodiments, a ghost pre-emption as discussed above may be avoided or at least reduced.

Thus, some embodiments pertain to a base station for a mobile telecommunications system including circuitry configured to communicate with at least one user equipment, wherein the circuitry is further configured to transmit, to the at least one user equipment, a multi-level pre-emption indicator for indicating, as first level information, first information about resources used for at least one short-data transmission within a transmission region which may contain at least one long-data transmission of the at least one user equipment, and, as second level information, second information about the resources used for the short-data transmission, wherein the second information more accurately indicates the resources used than the first information.

Some embodiments pertain to a user equipment for a mobile telecommunications system including circuitry configured to communicate with at least one base station, wherein the circuitry is further configured to receive, from the at least one base station, a multi-level pre-emption indicator indicating, as first level information, first information about resources used for at least one short data transmission within at transmission region which may contain at least one long data transmission of the at least one user equipment, and, as second level information, second information about the resources used for the short-data transmission, wherein the second information more accurately indicates the resources used than the first information.

In this specification, an eMBB transmission is an example for a "long data transmission" (or "long term transmission") and a URLLC transmission is an example for a "short data transmission" (or "short term transmission").

The transmission region may include at least one pre-defined resource or area of resources, which are defined, for example, based on a frequency range and a transmission timing. In some embodiments, the transmission region is the reference downlink region. Hence, in some embodiments, the first level indication addresses the transmission region, i.e. the reference downlink region. In some embodiments, multiple short data and/or long data transmissions may occur, also for different user equipment. Hence, in some embodiments, the multi-level pre-emption indicator is transmitted to multiple user equipment, e.g. forming a specific group of user equipment. Hence, in some embodiments, the group of user equipment belongs to the same transmission region (downlink reference region). In some embodiments, the base station indicates pre-emption within a transmission region (where the short-data transmission(s) occur), such as a reference downlink region, and the UE decides whether it collides with its long data transmission (eMBB) with the short-data transmission (URLLC).

Moreover, the first level information may have a coarser granularity than the second level information, as will also be discussed under reference of FIGS. 7 to 12 further below.

The base station may be based on the principles of LTE (LTE-A) and/or it may be based on NR RAT, as also discussed above. The base station may be based on the known eNodeB of LTE, as one example, or it may be based on the discussed NR gNodeB. The user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

The user equipment may correct data of the long data transmission which is corrupted by the interfering short data transmission, may acquire once more or make perform any other action, based on the received multi-level pre-emption indicator.

As will also become apparent from the discussion further below, the multi-level pre-emption indication may be transmitted in several parts, e.g. the first level information and the second level information may be transmitted separately.

Moreover, in some embodiments, the multi-level pre-emption indication includes also more than a first level information and second level information, but, for example, third (level) information, and/or fourth (level) information, etc., wherein the third (level) information may more accurately indicate the resources used than the second (level) information, the fourth (level) information may more accurately indicates the resources used than the third (level) information, etc.

In some embodiments, the first level information indicates the resources used based on a first resource grid dividing a reference downlink region into first resource regions. The first resource grid, may be restricted to 14 bits, as also discussed above.

In some embodiments, the second level information indicates the resources used within the first resource regions. Hence, the second (level) information more accurately indicates the resources used than the first (level) information. The second level information may indicate the resources used based on a second resource grid dividing the first resource regions into second resource regions, the second resource regions being smaller than the first resource regions. The second resource grid may have the same granularity as the first resource grid, but since it may be projected onto the resources regions indicated by the first resource grid, the second level information more accurately indicates the resources used.

The second resource grid may be included in the multi-level pre-emption indicator (e.g. in the first and/or second level information) or the configuration of the second resource grid (e.g. the dimension, whether it is 2×4, 4×4, etc.) may be radio resource control (RRC) configured or it may be signaled in any other procedure.

In some embodiments, the first level information indicates resources used being logically associated with each other within the transmission region and wherein the second level information is referred to the logically associated resources. Hence, the first level information may indicate resources used of different user equipments and/or at different point of times within the transmission region, wherein the resources may be distinct or separate to each other. Hence, those regions may be in the same reference downlink region (RDR). Thus, in such embodiments the second level information, such as the second resource grid, is referred to the logically associated resources by projecting, e.g. by the circuitry of the receiving user equipment, the second resource grid onto the separate, but logically associated resources indicated by the first level information as if those indicated regions were a single or contiguous region within the transmission region.

The first and/or second level information may include a two-dimensional bitmap, which, for example, represents a (first/second) resource grid.

In some embodiments, the second level information indicates whether to ignore the first level information or not.

In some embodiment, the first level information and/or the second level information is included in group common downlink control information (GC-DCI).

In some embodiments, the first level information and the second level information are included in the same group common downlink control information (GC-DCI).

In some embodiments, the first level information and the second level information are transmitted (received) with different periodicity and wherein the second level information includes information about the time interval associated with the first level information.

In some embodiments, the second level information is included in user equipment specific downlink control information.

In some embodiments, the second level information is included in each carrier of a carrier aggregation operation.

In some embodiments, the first level information is transmitted in a primary carrier and the second level information is transmitted in a secondary carrier.

In some embodiments, the second level information is transmitted for different bandwidth parts, wherein the same first level information may be associated with the different bandwidth parts, such that, for example, different bandwidth parts share the same first level information.

The features discussed in connection with the base station and/or user equipment can also be realized as a mobile telecommunications system method.

Returning to the detailed of embodiments, as also discussed above, in some embodiment the multi-level pre-emption indicator (PI) is introduced. In embodiment, the $1^{st}$ level of PI (first level information) is the existing Rel-15 PI carried by the GC-DCI (i.e. DCI format 2_1), which addresses a group of UEs and may have coarse granularity. The subsequent level would provide further information for the UEs that support multi-level PI (e.g. Rel-16 UEs), that would reduce ghost pre-emption, as discussed above. This recognizes that the information provided by the 1st level (Rel-15) PI can be used in combination with further information in subsequent level PI (e.g. second level information) for later release UE (i.e. Rel-16 and above). Hence, in this embodiment, the existing Rel-15 PI is not wasted.

In another embodiment, the $2^{nd}$ level PI (second level information) is a (second) resource grid, similar to the (first) resource grid used for the $1^{st}$ level PI, but the second resource grid is projected onto the resource region indicated by the $1^{st}$ level PI.

Figure 7:
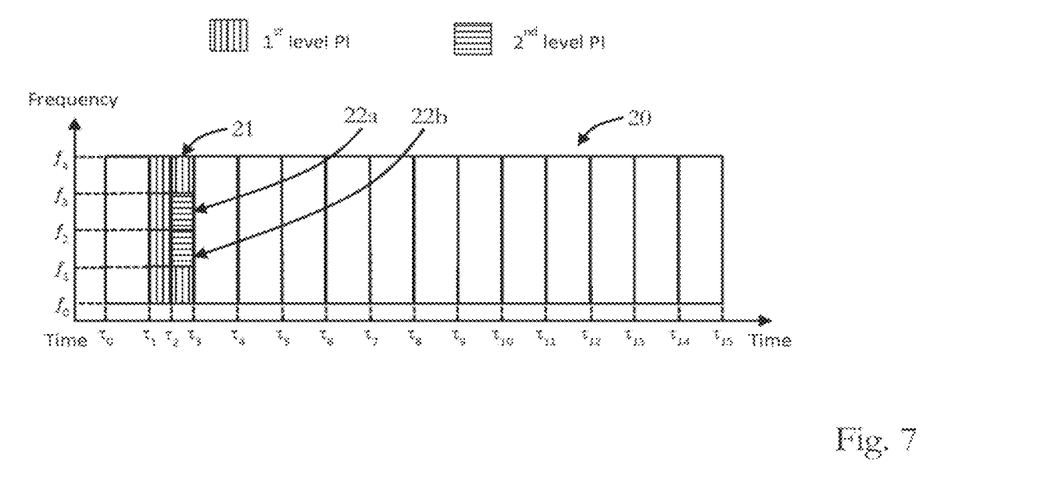
FIG. 7 illustrates an embodiment of an pre-emption indicator including first level information and second level information.

That is to say the RDR of the $2^{nd}$ level PI is the resource regions indicated by the $1^{st}$ level PI. An example is illustrated in FIG. 7, where the RDR 20 occupies time $\tau_0$ $\tau_{15}$ and frequency $f_0$ to $f_4$. The $1^{st}$ level PI is configured with a 1×14 resource grid and in this example the $1^{st}$ level PI indicates a pre-empted resource in the $2^{nd}$ resource region 21 occupying time $\tau_1$ to $\tau_3$ and frequency $f_0$ to $f_4$, which marked with vertical lines. In this embodiment, a $2^{nd}$ level PI is introduced and here it has a 4×2 resource grid, which is projected onto the indicated resource grid of the $1^{st}$ PI, i.e. on the resource region 21 for which it is indicated that the resources are used. In this embodiment, if nothing is indicated by the $1^{st}$ PI, the $2^{nd}$ PI is not transmitted. The $2^{nd}$ level PI then further indicates two resource regions 22a and 22b, respectively, occupying time $\tau_2$ to $\tau_3$ and frequency $f_1$ to $f_3$. In this embodiment, the $2^{nd}$ level PI utilizes information signaled in the $1^{st}$ level PI to provide a finer granularity of the resource region 21, and, thus, indicates the resources used more accurately. It should be appreciated that although this example uses a 4×2 resource grid for the $2^{nd}$ level PI, other resource grids can be used and that the present disclosure is not limited to the specific example of a 4×2 resource grid. The (second) resource grid can be RRC configured or dynamically indicated i.e. the $2^{nd}$ level PI itself can indicate which resource grid it would use in addition to the resource grid bitmap of the $1^{st}$ level PI. For example, there may be a choice of 4 resource grids, 4×2, 2×4 or 8×1, 1×8 and there will be 2 bit to indicate which resource grid is used and a 8 bit bitmap for the resource grid in some embodiments, without limiting the present disclosure in that regard to these specific examples.

Figure 8:
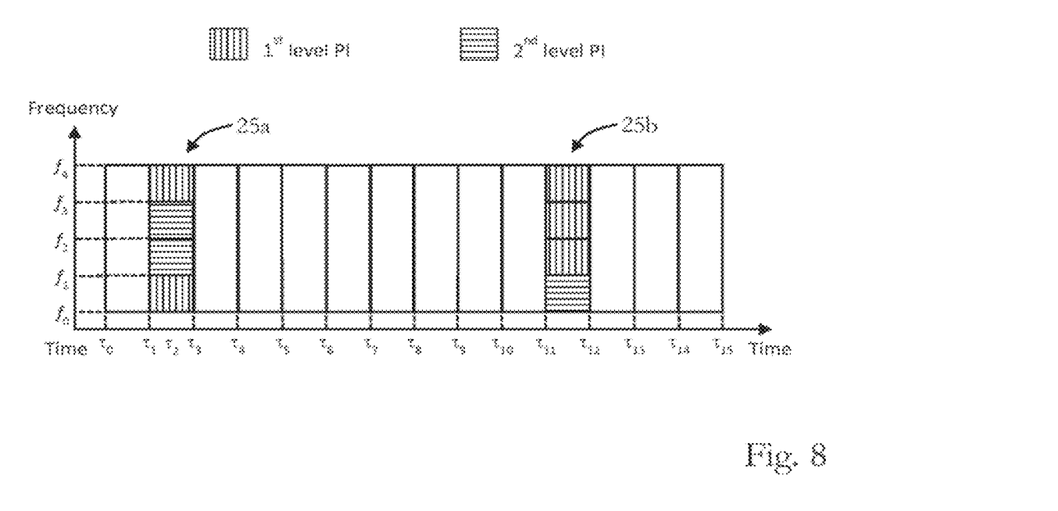
FIG. 8 illustrates indication of separate resource regions.
Figure 9:
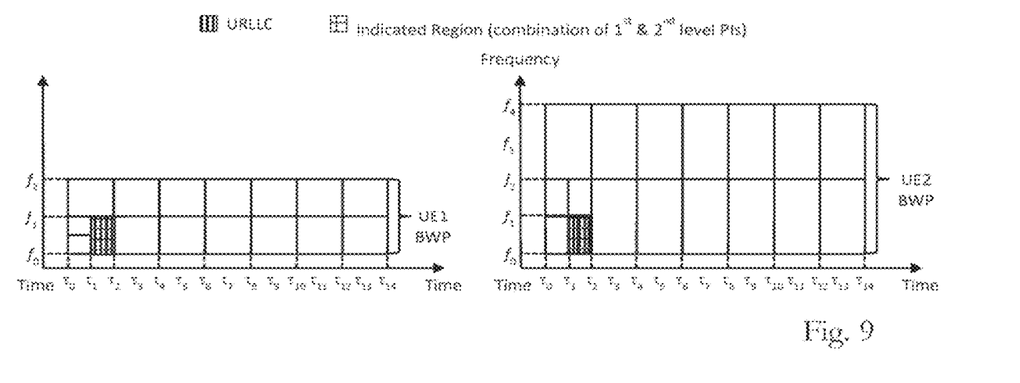
FIG. 9 illustrates separated second level information for different BWPs.
Figure 10:
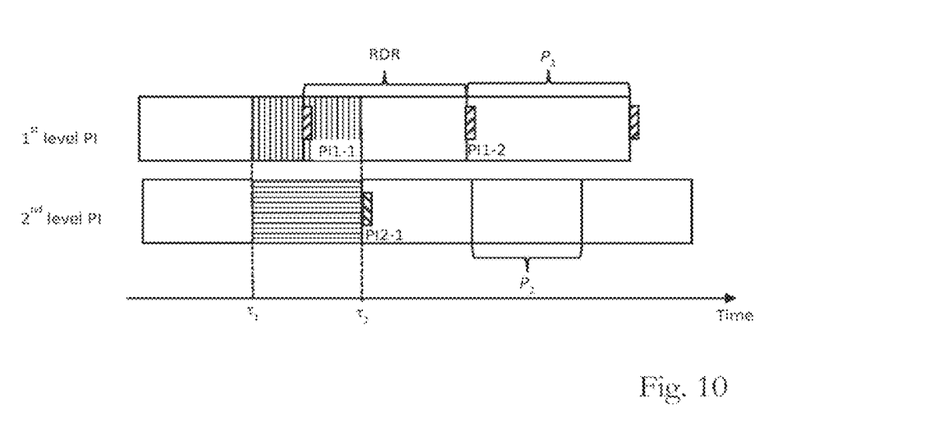
FIG. 10 illustrates different periodicity for first level and second level information.
Figure 11:
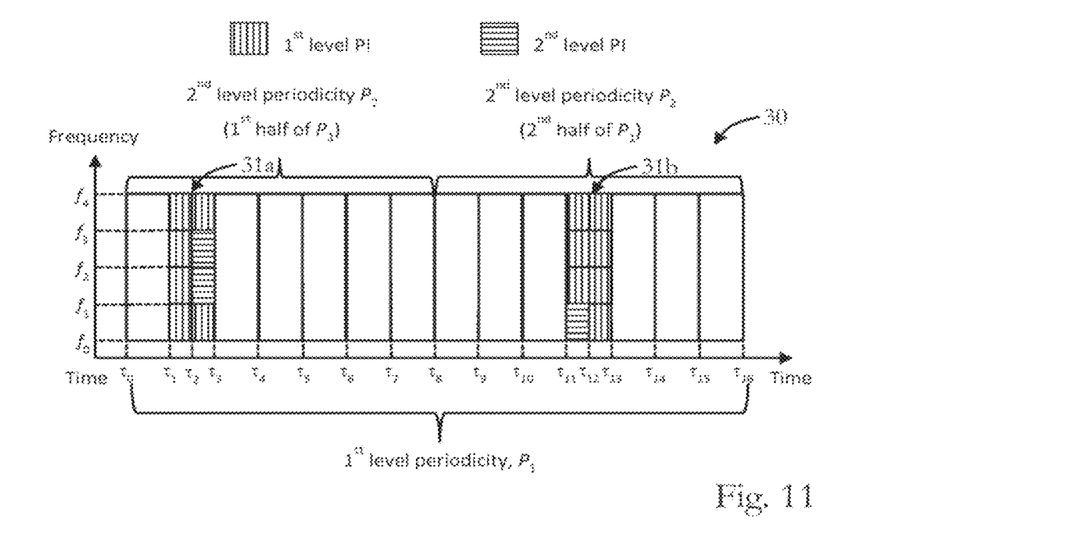
FIG. 11 illustrates another example of different periodicity for first level and second level information.

In another embodiment, if the $1^{st}$ PI indicates distinct resource regions, then the resource grid of the $2^{nd}$ PI is projected onto the logically combined resource regions, i.e. one resource region as if they were one contiguous region. As illustrated in FIG. 8, the $1^{st}$ PI, compared to the example of FIG. 7, now indicates two resource regions 25a and 25b, i.e. the $2^{nd}$ (between time $\tau_1$ to $\tau_3$) 25a and $10^{th}$ (between time $\tau_{11}$ to $\tau_{12}$) 25b resource regions are indicated as pre-empted, wherein the two resource regions 25a and 25b have a logical association with each other. The $2^{nd}$ level PI, which uses a 4×2 resource grid, is projected on these two resource region as if they were one contiguous region. Hence, each of the two resource regions 25a and 25b is divided into four resource regions by the second resource grid of the $2^{nd}$ level PI. Here, the granularity is coarser compared to that in FIG. 7, since the $2^{nd}$ level PI is projected onto a larger area. However, this still offers a finer granularity than just using the $1^{st}$ level PI since in the $1^{st}$ indicated resource region of the $1^{st}$ level PI, the $2^{nd}$ level PI can further indicate that only the resources occupying time $\tau_1$ to $\tau_3$ and frequency $f_1$ to $f_3$ are pre-empted. Similarly in the $2^{nd}$ indicated resource region of the $1^{st}$ level PI, the $2^{nd}$ level PI further indicates that only the resource region occupying time $\tau_{11}$ to $\tau_{12}$ and frequency $f_0$ to $f_1$ is pre-empted. Thus, also here, the $2^{nd}$ level PI (second level information) more accurately indicates the resources used than the $1^{st}$ level PI.

In another embodiment, a $2^{nd}$ level PI (second level information) is monitored for each different BWP. This is to address instances where a ghost pre-emption occurs due to UEs sharing the same $1^{st}$ level PI, but where the UEs are configured with different BWP, as also illustrated in FIG. 6. The embodiment illustrated in FIG. 9 refers to the example of FIG. 6, where a $2^{nd}$ level PI using a 2×2 resource grid for the $1^{st}$ BWP occupying frequency $f_0$ to $f_2$ is provided (left side of FIG. 9) and another $2^{nd}$ level PI using a 2×2 resource grid for the $2^{nd}$ BWP occupying frequency $f_0$ to $f_4$ is provided (right side of FIG. 9). UE1 (left side) is configured to use the $1^{st}$ BWP (frequency $f_0$ to $f_2$) and UE2 (right side) is configured to use the $2^{nd}$ BWP (frequency $f_0$ to $f_4$). A URLLC pre-emption occurs at time $\tau_1$ to $\tau_2$ and frequency $f_0$ to $f_1$, wherein the $1^{st}$ level PI indicates that the lower left resource region is pre-empted. UE1 would then further use the $2^{nd}$ level PI for the $1^{st}$ BWP which would project a 2×2 resource grid onto the lower left resource region indicated by the $1^{st}$ level PI and here this $2^{nd}$ level PI would indicate that the upper right and lower right resource regions are pre-empted thereby accurately capturing the pre-empted region (the indicated resource region and the resource region used of the URLLC transmission fully overlap in this case, wherein two regions of the resource grid of the $2^{nd}$ level PI correspond to the indicated region). Similarly UE2 (right side) would use the $2^{nd}$ level PI for the $2^{nd}$ BWP which would project a 2×2 resource grid onto the lower left resource region indicated by the $1^{st}$ level PI and here this $2^{nd}$ level PI would indicate that lower right resource region is pre-empted (the indicated resource region and the resource region used of the URLLC transmission fully overlap in this case, wherein one region of the resource grid of the $2^{nd}$ level PI corresponds to the indicated region). Hence, this embodiment reduces the ghost pre-empted seen using only the $1^{st}$ level PI (as is the case for FIG. 6). It should be appreciated that in other implementation, the $2^{nd}$ level PI may use different dimension resource grids in different BWPs, for example the BWP for UE1 may use a 2×2 resource grid whilst BWP for UE2 may use a 4×4 resource grid.

In another embodiment, the $2^{nd}$ level PI is carried by or included in the Group Common DCI (GC-DCI) that carries the $1^{st}$ level PI. This embodiment addresses that the $1^{st}$ level PI (i.e. the DL PI in Rel-15) only has 14 bits, but that the GC-DCI (format 2_1) has more than 14 bits so that its payload is aligned with other DCIs and hence, there are spare bits available for other information. This may have the benefit of avoiding additional configurations (e.g. periodicity, etc.) for the $2^{nd}$ level PI.

In another embodiment, the $2^{nd}$ level PI is indicated using a separate Group Common DCI (GC-DCI) to that of the $1^{st}$ level PI.

In another embodiment, where the said $2^{nd}$ level PI is indicated using GC-DCI, the $2^{nd}$ level PI addresses the resource region where the periodicity of the $1^{st}$ level and $2^{nd}$ level PIs overlaps. As exemplar illustrated in FIG. 10, the periodicities for the $1^{st}$ level PI and $2^{nd}$ level PI are $P_1$ and $P_2$ respectively, where here $P_1 > P_2$. The $2^{nd}$ level PI labelled as PI2-1, covers the times $\tau_1$ and $\tau_2$. It overlaps two RDRs (each block in FIG. 10 corresponds to one RDR), which in turn are covered by two $1^{st}$ level PIs, namely PI1-1 and PI1-2. The resource grid that the $2^{nd}$ level PI, namely PI2-1 projects onto the identified resources are therefore the resource regions indicated as being pre-empted by PI1-1 and PI1-2 within time $\tau_1$ and $T_2$. In cases where $P_1 = P_2$ and $1^{st}$ level PI and $2^{nd}$ level PI start at the same time, then they both addresses the same time region as exemplary illustrated in FIGS. 7 and 8.

For cases, where $P_1 > P_2$, the resource grid offered by the $2^{nd}$ level PI would potentially be projected in some instances onto a smaller area and hence would offer a finer granularity. As exemplary illustrated in FIG. 11, the RDR 30 addressed by the $1^{st}$ level PI occupies time $\tau_0$ to $\tau_{16}$ and frequency $f_0$ to $f_4$. Here, e.g. $P_1 = 2P_2$ and it is exemplary assumed that the $1^{st}$ level PI and $2^{nd}$ level PI are aligned so that within $P_1$ two $2^{nd}$ level PIs can be fitted with each $2^{nd}$ level PI addressing half of the $1^{st}$ level PI. That is, for the first half of $P_1$ a $2^{nd}$ level PI addressing the time period $\tau_0$ to $\tau_{16}$ is provided and for the second half of $P_1$ another $2^{nd}$ level PI addressing the time period $\tau_8$ to $\tau_{16}$ is provided. It is assumed again that the $2^{nd}$ level PI uses a 4×2 (second) resource grid and that the $1^{st}$ level PI indicates that the $2^{nd}$ (between time $\tau_1$ to $\tau_3$) 31a and $10^{th}$ (between time $\tau_{11}$ to $\tau_{13}$) 31b resource regions are pre-empted. Since the first half of the RDR (time $\tau_0$ to $\tau_8$) 30 is addressed by a $2^{nd}$ level PI, the resource region 31a indicated by the $1^{st}$ level PI (between time $\tau_1$ to $\tau_3$ and frequency $f_0$ to $f_4$) benefits from a resource region of finer granularity. Similarly the second half of the RDR (time $\tau_8$ to $\tau_{16}$) 31b benefited from the finer granularity offered by the $2^{nd}$ level PI (i.e. the $2^{nd}$ level PI more accurately indicates that resources used than the $1^{st}$ level PI).

In another embodiment, the $2^{nd}$ level PI is indicated using UE specific DCI. This $2^{nd}$ level PI can be transmitted after the actual pre-emption which can occur during the eMBB transmission or after the eMBB transmission.

In another embodiment, the $2^{nd}$ level PI signals to the UE to ignore the $1^{st}$ level PI due to ghost pre-emption. During the Rel-15 specification, as also mentioned above, it was noted that there are at least two cases when the $1^{st}$ level PI wrongly indicates a pre-emption:

First, when the UE receiving the PI is the pre-emptor. This may occur for a UE that is capable of receiving eMBB and URLLC and is configured to monitor the $1^{st}$ level PI. This UE can be scheduled a URLLC transmission, which may cause pre-emption to other UEs. Since this UE monitors the $1^{st}$ level PI, it would wrongly assume that it has been entirely pre-empted and would unnecessarily discard its entire URLLC reception.

Second, in Rel-15, it was agreed that the $1^{st}$ level PI is transmitted in the Primary carrier and is applicable for all the carriers in a Carrier Aggregation (CA) operation. In CA, a UE is configured to operate in multiple carriers in different frequencies. If only one of the carrier is pre-empted, the $1^{st}$ level PI would wrongly indicate that the other carriers are also pre-empted.

In another embodiment, the $2^{nd}$ level PI signals an "ignore" indicator to the UE, wherein this $2^{nd}$ level PI is carried by a UE specific DCI. This may be useful for cases where the UE is the pre-emptor and so the "ignore" indicator is targeted at that UE. It should be noted that in the prior art document 3GPP R1-1720099, "Remaining details of multiplexing of different data channel durations", 3GPP TSG RAN WG1 Meeting 91, Reno, USA, Nov. 27-Dec. 1, 2017, it seems to be proposed that the DL grant indicates whether the transmission is URLLC and the UE would ignore the Rel-15 PI (i.e. $1^{st}$ level PI). However, this method seemed to assume that URLLC cannot be pre-empted and that the gNB knows that a pre-emption would take place before the pre-emption occurs. It should be appreciated that the reason that the DL PI is transmitted after the RDR, in some embodiments, is because the gNB does not yet know whether any transmission will be pre-empted when it schedules eMBB transmission (if it did, it would have scheduled the eMBB elsewhere or avoided scheduling it).

In another embodiment, where the $2^{nd}$ level PI indicates "ignore" it can further indicate which resource is pre-empted. That is, it overrides the pre-emption indicated in the $1^{st}$ level PI rather than built upon the information signalled in the $1^{st}$ level PI. If the $2^{nd}$ level PI does not indicate "ignore" (or indicates "consider") then the embodiments previously discussed in combining $1^{st}$ level PI and $2^{nd}$ level PI can be implemented. In a variation, the $2^{nd}$ level PI uses a resource grid if it indicates "ignore" and another (different) resource grid if it indicates "consider". For example, if the $2^{nd}$ level PI indicates "ignore" it uses a 1×14 grid and if it indicates "consider" it uses a 4×2 resource grid, without limiting the present disclosure in that regard.

In another embodiment, the $2^{nd}$ level PI that signals the "ignore" indicator also indicates which carrier in a CA operation can ignore the $1^{st}$ level PI. For example, if the UE is configured with 16 carriers, then a bitmap of 16 bits is provided, wherein each bit indicates whether to ignore or consider the $1^{st}$ level PI.

Figure 12:
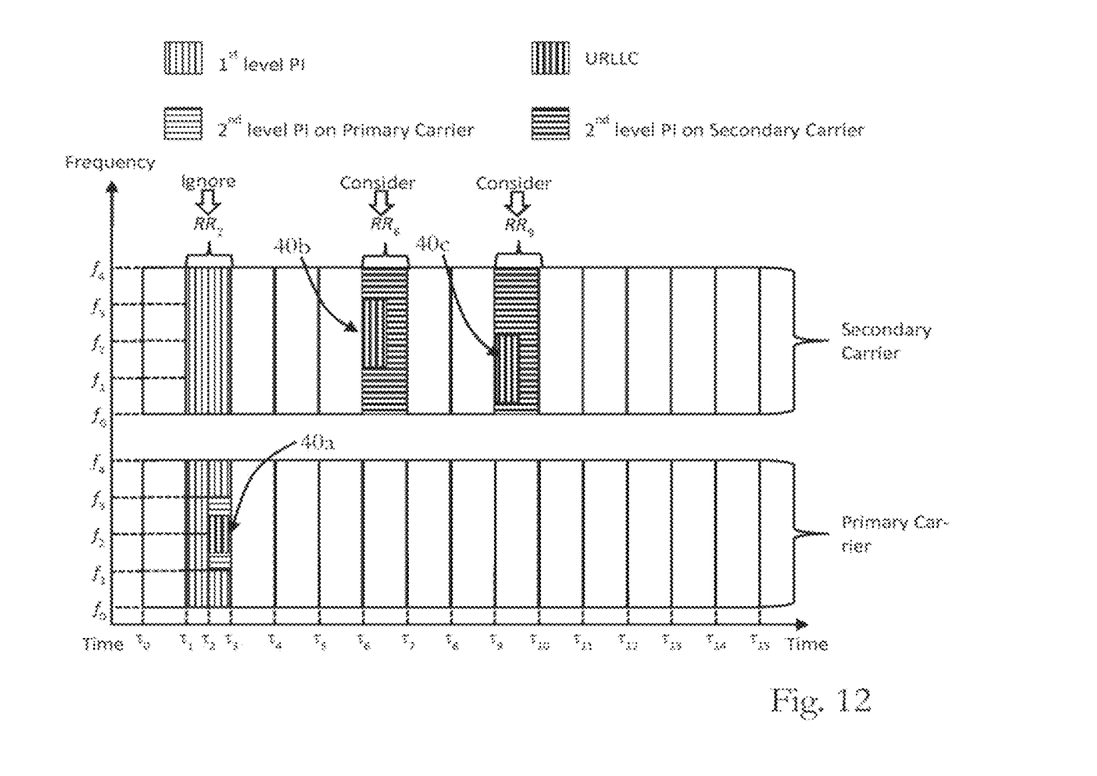
FIG. 12 illustrates an embodiment with a Primary and a Secondary Carrier.

In another embodiment, the $2^{nd}$ level PI is transmitted in the other carriers in a CA operation, i.e. not the Primary carrier carrying the $1^{st}$ level PI (but, e.g. in a Secondary carrier). In this case, the $2^{nd}$ level PI in a carrier can indicate to "ignore" or "consider" the $1^{st}$ level PI. It further indicates an updated pre-emption to the UE operating in that carrier. The $2^{nd}$ level PI in the non Primary Carrier may use a different resource grid than in the Primary Carrier. FIG. 12 exemplary illustrates an example, where the UE is configured to operate CA with two carriers, Primary Carrier (lower side of FIG. 12) and Secondary Carrier (upper side of FIG. 12). The UE monitors the $1^{st}$ level PI and the $2^{nd}$ level PI in the Primary Carrier and monitors a separate $2^{nd}$ level PI in the Secondary Carrier. The $1^{st}$ level PI uses a 1×14 grid, the $2^{nd}$ level PI in the Primary Carrier uses a 4×2 grid and the $2^{nd}$ level PI in the Secondary Carrier uses a 1×14 grid if it indicates "ignore" and 4×2 grid if it indicates "consider". The Primary and Secondary carriers experienced URLLC pre-emption but at different locations, namely at 40a in the Primary Carrier and at 40b and 40c in the Secondary Carrier. In the Primary Carrier the UE utilises both the $1^{st}$ level PI and $2^{nd}$ level PI to determine the area that is pre-empted as discussed for previous embodiments. In the Secondary Carrier, the $2^{nd}$ level PI firstly indicates "ignore" in which the UE ignores the $1^{st}$ level PI (which indicates a pre-emption in the $2^{nd}$ Resource Region labelled as $RR_2$ in FIG. 12) and then it indicates that the $6^{th}$ and $9^{th}$ Resource Regions (labelled as $RR_6$ and $RR_9$) are pre-empted by using a 1×14 resource grid, which the UE would take into consideration when decoding any eMBB transmission.

In another embodiment, if the $1^{st}$ level PI is not transmitted but the $2^{nd}$ level PI is transmitted, the UE then projects the resource grid in the $2^{nd}$ level PI onto the RDR. That is, the $2^{nd}$ level PI replaces the $1^{st}$ level PI and the UE treats the $2^{nd}$ level PI as the $1^{st}$ level PI but with a different resource grid. In a variant, when the $1^{st}$ level PI is transmitted, the resource grid in the $2^{nd}$ level PI is different to that when the $1^{st}$ level PI is not transmitted. For example if the $1^{st}$ level PI is transmitted, the $2^{nd}$ level PI uses a 4×2 resource grid and if the $1^{st}$ level PI is not transmitted, the $2^{nd}$ level PI uses a 1×14 resource grid.

It should be appreciated that this invention is not limited to only two levels of PI and that a third or a fourth level (or additional levels) can be added such that the third level uses the information of the $1^{st}$ and $2^{nd}$ level PI's to offer finer granularity, and, thus, a more accurate indication of the resources used. As exemplary illustrated in FIG. 13, the $1^{st}$ level PI uses a 1×14 resource grid and indicates two distinct resource regions 50a and 50b as being pre-empted, i.e. $2^{nd}$ resource region (time $\tau_1$ to $\tau_3$) 50a and $10^{th}$ resource region (time $\tau_{11}$ to $\tau_{13}$) 50b. The $2^{nd}$ level PI uses a 4×2 resource grid and the $3^{rd}$ level PI uses a 2×2 resource grid. The $2^{nd}$ level PI's resource grid would be projected onto the $2^{nd}$ resource region 50a and the $3^{rd}$ level PI's resource grid would be projected onto the $10^{th}$ resource region 50b thereby offering finer granularity. Here the $2^{nd}$ level PI indicates that the area between time $\tau_2$ to $\tau_3$ and frequency $f_1$ to $f_2$ is pre-empted whilst the $3^{rd}$ level PI indicates that the area between time to $\tau_{11}$ to $\tau_{12}$ and frequency $f_0$ to $f_2$ is pre-empted.

As described above, in the prior art it has been proposed that the DL grant (carried by a DCI) indicates whether the scheduling is for a URLLC or eMBB transmission and, if it is for an URLLC transmission, the UE ignores the PI. This assumes that URLLC cannot be pre-empted and that the gNB somehow knew a pre-emption would occur before it actually occurs, which however is not the case in some of the embodiments.

Figure 13:
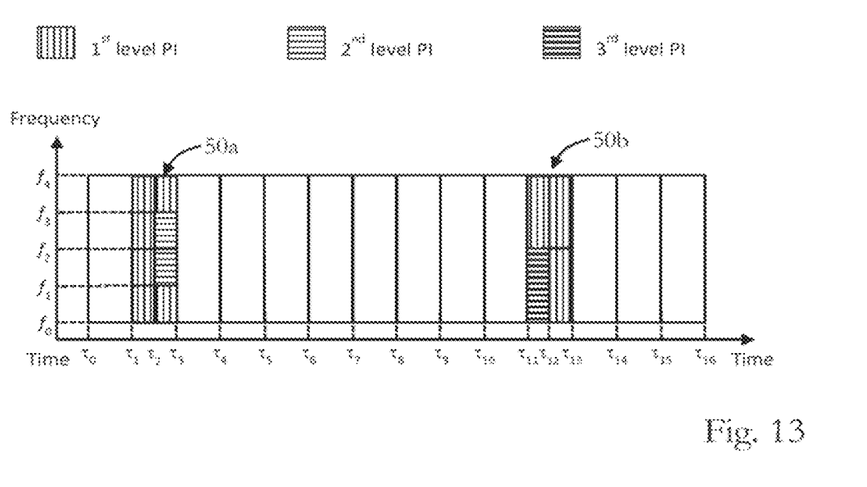
FIG. 13 illustrates an embodiment with first level information, second level information and third level information.
Figure 14:
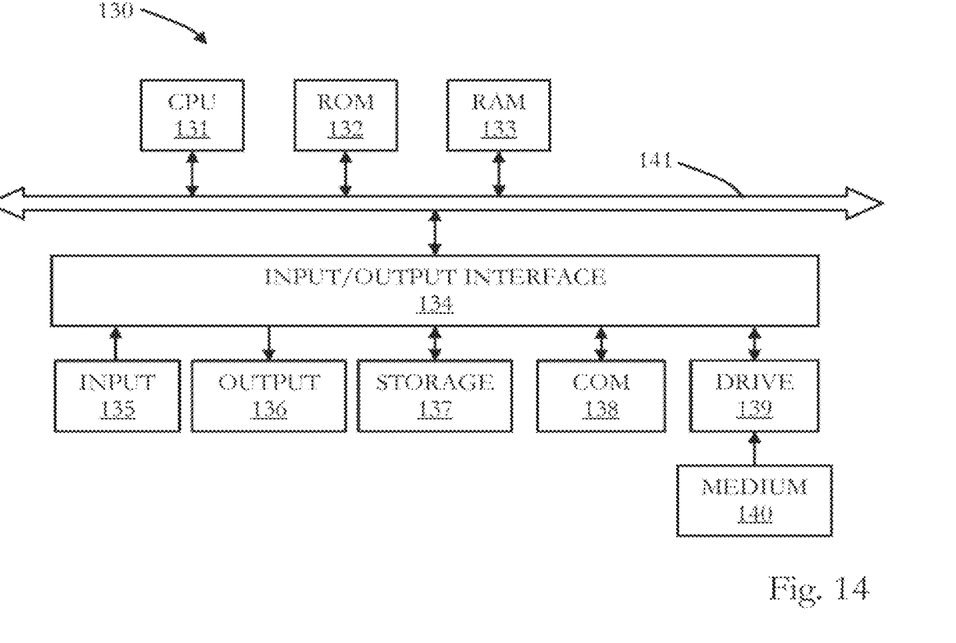
FIG. 14 illustrates a multi-purpose computer which can be used for implementing a user equipment or a base station.

In the prior art (3GPP R1-1717970, "remaining issues on pre-emption indication for downlink", 3GPP TSG RAN WG1 Meeting 90bis, Prague, CZ, 9-13, Oct. 2017) a hierarchical PI indicator was proposed where the PI firstly indicates one time slot (e.g. symbol or mini-slot) where the pre-emption occurs followed by a 2D bitmap projecting a resource grid onto that one time slot. However, according to this known proposal it was unable to indicate pre-emption that occurs in more than one time instance, i.e. two distinct pre-emptions as illustrated in FIG. 13. According to the present disclosure, the second level information, e.g. a resource grid, is projected onto the logical combined resource regions (distinct or contiguous) indicated as being pre-empted by the $1^{st}$ level PI:

In the following, an embodiment of a general purpose computer 130 is described under reference of FIG. 14. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network ELAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A base station for a mobile telecommunications system comprising circuitry configured to communicate with at least one user equipment, wherein the circuitry is further configured to:

transmit, to the at least one user equipment, a multi-level pre-emption indicator for indicating, as first level information, first information about resources used for at least one short-data transmission within a transmission region which may contain at least one long-data transmission of the at least one user equipment, and, as second level information, second information about the resources used for the short-data transmission, wherein the second information more accurately indicates the resources used than the first information.

(2) The base station of (1), wherein the transmission region is a reference downlink region.

(3) The base station of (2), wherein the first level information indicates the resources used based on a first resource grid dividing the reference downlink region into first resource regions.

(4) The base station of (3), wherein the second level information indicates the resources used within the indicated first resource regions.

(5) The base station of (4), wherein the second level information indicates the resources used based on a second resource grid dividing the indicated first resource regions into second resource regions, the second resource regions being smaller than the first resource regions.

(6) The base station of (4) or (5), wherein the second resource grid is included in the multi-level pre-emption indicator or wherein the configuration of the second resource grid is radio resource control configured.

(7) The base station of anyone of (1) to (6), wherein the first level information indicates resources used being logically associated with each other within the transmission region and wherein the second level information is referred to the logically associated resources.

(8) The base station of anyone of (1) to (7), wherein the first level information or the second level information includes a two-dimensional bitmap.

(9) The base station of anyone of (1) to (8), wherein the second level information indicates whether to ignore the first level information or not.

(10) The base station of anyone of (1) to (9), wherein the first level information or the second level information is included in group common downlink control information.

(11) The base station of (10), wherein the first level information and the second level information are included in the same group common downlink control information.

(12) The base station of anyone of (1) to (11), wherein the first level information and the second level information are transmitted with different periodicity and wherein the second level information includes information about the time interval associated with the first level information.

(13) The base station of anyone of (1) to (12), wherein the second level information is included in user equipment specific downlink control information.

(14) The base station of anyone of (1) to (13), wherein the second level information is included in each carrier of a carrier aggregation operation.

(15) The base station of anyone of (1) to (14), wherein the first level information is transmitted in a primary carrier and the second level information is transmitted in a secondary carrier.

(16) The base station of anyone of (1) to (15), wherein the second level information is transmitted for different bandwidth parts.

(17) The base station of (16), wherein the same first level information is associated with the different bandwidth parts.

(18) A user equipment for a mobile telecommunications system comprising circuitry configured to communicate with at least one base station, wherein the circuitry is further configured to:

receive, from the at least one base station, a multi-level pre-emption indicator indicating, as first level information, first information about resources used for at least one short data transmission within a transmission region which may contain at least one long data transmission of the at least one user equipment, and, as second level information, second information about the resources used for the short-data transmission, wherein the second information more accurately indicates the resources used than the first information.

(19) The user equipment of (18), wherein the transmission region is a reference downlink region.

(20) The user equipment of (18), wherein the first level information indicates the resources used based on a first resource grid dividing a reference downlink region into first resource regions.

(21) The user equipment of (20), wherein the second level information indicates the resources used within the first resource regions.

(22) The user equipment of (21), wherein the second level information indicates the resources used based on a second resource grid dividing the first resource regions into second resource regions, the second resource regions being smaller than the first resource regions.

(23) The user equipment of (21) or (22), wherein the second resource grid is included in the multi-level pre-emption indicator or wherein the second resource grid is radio resource control configured.

(24) The user equipment of anyone of (18) to (23), wherein the first level information indicates resources used being logically associated with each other.

(25) The user equipment of anyone of (18) to (24), wherein the first level information or the second level information includes a two-dimensional bitmap.

(26) The user equipment of anyone of (18) to (25), wherein the second level information indicates whether to ignore the first level information or not.

(27) The user equipment of anyone of (18) to (26), wherein the first level information or the second level information is included in group common downlink control information.

(28) The user equipment of (27), wherein the first level information and the second level information are included in the same group common downlink control information.

(29) The user equipment of anyone of (18) to (28), wherein the first level information and the second level information are received with different periodicity and wherein the second level information includes information about the time interval associated with the first level information.

(30) The user equipment of anyone of (18) to (29), wherein the second level information is included in user equipment specific downlink control information.

(31) The user equipment of anyone of (18) to (30), wherein the second level information is included in each carrier of a carrier aggregation operation.

(32) The user equipment of anyone of (18) to (31), wherein the first level information is transmitted in a primary carrier and the second level information is transmitted in a secondary carrier.

(33) The user equipment of anyone of (18) to (32), wherein the second level information is transmitted for different bandwidth parts.

(34) The user equipment of (33), wherein the same first level information is associated with the different bandwidth parts.

The invention claimed is:

1. Circuitry for a user equipment in a mobile telecommunications system, the circuitry comprising:
   transceiver circuitry; and
   control circuitry configured with the transceiver circuitry to receive, from at least one base station, a multi-level pre-emption indicator indicating, as first level information, first information about resources used for at least one short data transmission within a transmission region which may contain at least one long data transmission of the at least one user equipment, and, as second level information, second information about the resources used for the short-data transmission, wherein
   the second information more accurately indicates the resources used more accurately than the first information indicates resources used,
   the first level information indicates the resources used based on a first resource grid indicating the transmission region divided into first resource regions, and
   the second level information indicates the resources used within the indicated first resource regions.

2. The circuitry of claim 1, wherein the second level information indicates the resources used based on a second resource grid dividing the indicated first resource regions into second resource regions, the second resource regions being smaller than the first resource regions.

3. The circuitry of claim 1, wherein the second resource grid is included in the multi-level pre-emption indicator or wherein the configuration of the second resource grid is radio resource control configured.

4. The circuitry of claim 1, wherein the first level information indicates resources used being logically associated with each other within the transmission region and wherein the second level information is referred to the logically associated resources.

5. The circuitry of claim 1, wherein the first level information or the second level information includes a two-dimensional bitmap.

6. The circuitry of claim 1, wherein the second level information indicates whether to ignore the first level information or not.

7. The circuitry of claim 1, wherein the first level information or the second level information is included in group common downlink control information.

8. The circuitry of claim 7, wherein the first level information and the second level information are included in the same group common downlink control information.

9. The circuitry of claim 1, wherein the first level information and the second level information are transmitted with different periodicity and wherein the second level information includes information about a time interval associated with the first level information.

10. The circuitry of claim 1, wherein the second level information is included in user equipment specific downlink control information.

11. The circuitry of claim 1, wherein the second level information is included in each carrier of a carrier aggregation operation.

12. The circuitry of claim 1, wherein the first level information is transmitted in a primary carrier and the second level information is transmitted in a secondary carrier.

13. The circuitry of claim 1, wherein the second level information is transmitted for different bandwidth parts.

14. The circuitry of claim 13, wherein a same first level information is associated with the different bandwidth parts.

15. Circuitry for a base station of a mobile telecommunications system, the circuitry comprising:
    transceiver circuitry; and
    control circuitry configured with the transceiver circuitry to transmit, to at least one user equipment, a multi-level pre-emption indicator for indicating, as first level information, first information about resources used for at least one short-data transmission within a transmission region which may contain at least one long-data transmission of the at least one user equipment, and, as second level information, second information about the resources used for the short-data transmission, wherein
    the second information indicates the resources used more accurately than the first information indicates resources used,
    the first level information indicates the resources used based on a first resource grid indicating the transmission region divided into first resource regions, and
    the second level information indicates the resources used within the indicated first resource regions.

16. The circuitry of claim 15, wherein the second level information indicates the resources used based on a second resource grid dividing the indicated first resource regions into second resource regions, the second resource regions being smaller than the first resource regions.

17. The circuitry of claim 15, wherein the second resource grid is included in the multi-level pre-emption indicator or wherein the configuration of the second resource grid is radio resource control configured.

18. The circuitry of claim 15, wherein the first level information indicates resources used being logically associated with each other within the transmission region and wherein the second level information is referred to the logically associated resources.

19. The circuitry of claim 15, wherein the first level information or the second level information is included in group common downlink control information.

20. The circuitry of claim 19, wherein the first level information and the second level information are included in the same group common downlink control information.

* * * * *